United States Patent
Oh et al.

(10) Patent No.: US 8,199,849 B2
(45) Date of Patent: Jun. 12, 2012

(54) DATA TRANSMITTING DEVICE, DATA RECEIVING DEVICE, DATA TRANSMITTING SYSTEM, AND DATA TRANSMITTING METHOD

(75) Inventors: Myeong Hoon Oh, Daejeon (KR); Chi Hoon Shin, Daejeon (KR); Young Woo Kim, Daejeon (KR); Sung Nam Kim, Daejeon (KR); Seong Woon Kim, Gyeryong-si (KR); Han Namgoong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 485 days.

(21) Appl. No.: 12/487,593

(22) Filed: Jun. 18, 2009

(65) Prior Publication Data

US 2010/0135430 A1 Jun. 3, 2010

(30) Foreign Application Priority Data

Nov. 28, 2008 (KR) ........................ 10-2008-0119279

(51) Int. Cl.
*H04L 25/34* (2006.01)
(52) U.S. Cl. ........ 375/286; 375/259; 375/288; 375/295; 375/316; 375/354; 375/358; 326/21; 326/23; 326/83; 327/100; 327/102
(58) Field of Classification Search .................. 375/259, 375/286, 288, 295, 316, 354, 358; 326/21, 326/23, 83; 327/100, 102
See application file for complete search history.

(56) References Cited

U.S. PATENT DOCUMENTS

| 7,282,946 B2 * | 10/2007 | Har et al. ........................ 326/21 |
| 2006/0190851 A1 * | 8/2006 | Karaki et al. ..................... 716/3 |
| 2008/0123765 A1 | 5/2008 | Oh et al. |

FOREIGN PATENT DOCUMENTS

| KR | 100447217 B1 | 8/2004 |
| KR | 100791229 B1 | 12/2007 |

OTHER PUBLICATIONS

Mark E. Dean et al., "Efficient self-timing with level-encoded 2-phase dual-rail(LEDR)" Proc. of Advanced Research in VLSI, 1991, Stanford University.

* cited by examiner

*Primary Examiner* — Leon Flores

(57) ABSTRACT

Provided are a data transmitting device transmitting data through a delay insensitive data transmitting method and a data transmitting method. The data transmitting device and the data transmitting method use the delay insensitive data transmitting method supporting a 2-phase hand shake protocol. During data transmission, data are encoded into three logic state having no space state through a ternary encoding method. According to the data transmitting device and the data transmitting method, data are stably transmitted to a receiver regardless of the length of a wire, and provides more excellent performance in an aspect of a data transmission rate, compared to a related art 4-phase delay data transmitting method.

20 Claims, 3 Drawing Sheets

DATA TRANSMITTING DEVICE, DATA RECEIVING DEVICE, DATA TRANSMITTING SYSTEM, AND DATA TRANSMITTING METHOD

CROSS-REFERENCE TO RELATED APPLICATIONS

This application claims priority under 35 U.S.C. §119 to Korean Patent Application No. 10-2008-119279, filed on Nov. 28, 2008, the disclosure of which is incorporated herein by reference in its entirety.

TECHNICAL FIELD

The present disclosure relates to data transmitting system and a data transmitting method, and in particular, to a data transmitting system for transmitting information through a delay insensitive data transmitting method, and a data transmitting method.

BACKGROUND

Currently, due to development of semiconductor fabrication technologies and integrated circuit design technologies, an integrated circuit system is mainly designed with a System-On-Chip (SoC) which integrates all components of a system into one chip.

As the semiconductor fabrication technologies and the integrated circuit design technologies have recently been further developed, the number of devices, which can be integrated into one chip, is increased gradually. Due to this trend, a wiring structure of transmission lines designed in one chip becomes complex. Accordingly, if the integrated circuit system is realized with a SoC design method, the number and lengths of transmission lines and the signal delay caused due to interference therebetween are very important design parameters that should be considered for normal operations of an entire chip.

In another case, if a synchronous design method using a global clock is applied to an integrated circuit system realized with the SoC design method, there occur clock skew and jitter due to the increase of a clock speed and also transmission delay of data due to the increase of the number and lengths of transmission lines. These limitations may be resolved by applying an asynchronous design method to the integrated circuit system realized with the SoC design method.

The asynchronous design method performs data transmission through a Delay Insensitive (DI) data transmitting method that does not use a global clock and supports a handshake protocol that is irrelevant to a delay time. Therefore, the above-mentioned limitations due to the synchronous design method can be resolved. However, according to this asynchronous design method, designing an entire circuit becomes complex and also a Computer Aided Design (CAD) tool used for this asynchronous design method is not sufficiently provided.

As a proposal that may simultaneously resolve the limitations of the synchronous and asynchronous design methods, researches for a Globally Asynchronous Locally Synchronous (GALS) system are actively under development lately.

The GALS system includes a plurality of Locally Synchronous (LS) modules that basically do not use a global clock and operate by independent clocks. Data transmission between the LS modules is completed through an asynchronous handshake protocol.

That is, since the GALS system does not use a global clock, the limitations such as the above mentioned clock skew and jitter are resolved. Since data transmission is completed between the LS modules that operate by different timings through the DI data transmitting method, its stability can be achieved.

In the DI data transmitting method, data are represented through a data encoding method such as dual-rail and 1-of-4. A 4-phase handshaking protocol similar to a related art synchronous design method is used for the DI data transmitting method.

In the 4-phase handshaking protocol, data are basically represented with a binary value of a Return to Zero (RZ) type. That is, according to the 4-phase handshaking protocol, there exists a space state for distinguishing continuous data. Since the space state has the same latency as data, a 2-phase handshaking protocol method having no space state is more effective than the 4-phase handshaking protocol method in the GALS system where data transmission occurs frequently.

According to the 2-phase handshaking protocol based on a dual-rail, which is known as a Level-Encoded 2-phase Dual-Rail (LEDR), its one wire is encoded with data and the other wire is encoded with a phase change. This is different from a related art dual-rail based 2-phase protocol that encodes data transmission of 0 and 1 with state changes of the respective two wires. That is, data of 0 and 1 are encoded with a level not a state change in one wire, and distinction between data is accomplished with a change of the other wire.

As a result, an XOR value of the two wires is changed according to each data transmission and this is detected to determine effectiveness of data. Since there is no necessary for decoding data, compared to the related art dual-rail based 2-phase protocol, performance of the dual-rail based 2-phase handshaking protocol becomes higher and its design complexity becomes less. However, since the 2N+1 number of wires is required for N-bit data transmission, performance, power consumption, and design complexity of the dual-rail based 2-phase handshaking protocol become disadvantageous by the increased number of wires.

In "signal transmitting and receiving device for a new wiring system disclosed in Korean Patent Application No. 1997-018460, several different kinds of signals are simultaneously transmitted through one wire between a plurality of function blocks in an integrated circuit. Thus, a single transmitting and receiving device for a new wiring system, which is capable of reducing its area that wiring occupies, can be provided. Theoretically, while N-bit data are transmitted, the $2^N$ number of voltage values having a triangle pulse shape is encoded and transmitted through one wire and then, a receiver circuit detects this and restores the transmitted N-bit data. Therefore, the number of wires necessary for wiring is decreased and an overall area of an integrated circuit is reduced. However, as the number of voltage values that can be encoded in a wire is increased, the number of logic to be decoded is increased. As a result, complexity of a receiver circuit becomes increased more and thus there occur limitations in reducing the number of wires. Since the tendency is toward lowering a supply voltage in an integrated circuit, a multiple valued logic circuit technique using a voltage that this invention uses may deteriorate a noise margin characteristic of a voltage in a receiver circuit. Additionally, since a function for providing a handshake protocol necessary for DI transmission is not provided, the multiple valued logic circuit technique cannot be applied to the GALS systems.

Various protocols for supporting DI transmission and applying a ternary encoding method to reduce the number of wires have been studied.

In "Delay-insensitive data transfer circuit using current-mode multiple-valued logic" disclosed in U.S. Pat. No. 7,282,946, a noise margin of a supply voltage is not affected through a multiple valued logic of a current mode method and three logic states can be represented in one wire. Therefore, circuit design having N+1 wires can be used for N-bit data transmission.

In "Delay insensitive data transfer apparatus with low power consumption" disclosed in U.S. Patent Publication No. 20080123765, a high constant current consumption characteristic occurring in the related art DI data transmitting method using a current mode is complemented and thus power consumption in a standby state is drastically reduced.

However, since the DI data transmitting method using the above-mentioned two kinds of current mode circuits is fundamentally based on a 4-phase data transmitting method, its performance is theoretically reduced to the half, compared to a 2-phase DI data transmitting method such as LEDR.

SUMMARY

Accordingly, the present disclosure provides a data transmitting device for supporting a 2-phase handshake protocol of a DI data transmitting method (which is capable of transmitting data regardless of a transmission delay time) and encoding data through a ternary encoding method having no space state.

The present disclosure also provides a data receiving device for supporting a 2-phase handshake protocol of a DI data transmitting method and decoding data encoded through a ternary encoding method having no space state.

The present disclosure also provides a data transmitting system including a data transmitting device and a data receiving device.

The present disclosure also provides a data transmitting method for supporting a 2-phase handshake protocol of a DI data transmitting method and transmitting data through a ternary encoding method having no space state.

According to an aspect, there is provided a data transmitting device transmitting data according to a delay insensitive data transmitting method, including: a data transmitter generating a request signal and a data signal, the data signal having a Non-Return-to-Zero (NRZ) format that is divided into a binary value 0 and a binary value 1 at a transition point of the request signal; and an encoder receiving the request signal and the data signal and calculating the received request signal and data signal in order to convert the binary value 0, the binary value 1, and a current binary value identical to a previous binary value into different current levels.

According to another aspect, there is provided a data receiving device receiving a request signal and a data signal from a transmitter through a delay insensitive data transmitting method, including: a decoder receiving an input current signal having three logic states, generating a voltage value corresponding to the three logic states through a reference current generated in the decoder, and restoring the request signal and the data signal through the generated voltage value, the three logic states including a high state that represents a binary value 1, a low state that represents a binary value 0, and a middle state that represents a current binary value identical to a previous binary value; and a data receiver transmitting a reply signal to the transmitter in response to the restored request signal and the restored data signal.

According to another aspect, there is provided a data transmitting system including a plurality of locally synchronous modules that perform mutual data communications through a delay insensitive data transmitting method, including: a data transmitter generating a request signal and a data signal, the data signal having a Non-Return-to-Zero (NRZ) format that is divided into a binary value 0 and a binary value 1 at a transition point of the request signal; an encoder receiving the request signal and the data signal, outputting a first current level if the binary value 1 is transmitted, outputting a second current level lower than the first current level if the binary value 0 is transmitted, and outputting a third current level lower than the first current level and higher than the second current level if a current binary value identical to a previous binary value is transmitted; a decoder detecting the first to third current levels, generating a voltage value corresponding to the detected current level, and restoring the request signal and the data signal according to the generated voltage value; and a data receiver generating a reply signal in response to the restored request signal and data signal to transmit the reply signal to the data transmitter.

According to another aspect, there is a data transmitting method transmitting data through a delay insensitive data transmitting method, including: receiving a request signal and a data signal, the data signal having a Non-Return-to-Zero (NRZ) format that is divided into a binary value 0 and a binary value 1 at a transition point of the request signal; and sampling the data signal (hereinafter, referred to as a current data signal) that is currently inputted at a transition point of the request point, and sampling the data signal (hereinafter, referred to as a previous data signal) that is previously inputted at a transition point of the request signal; performing on a comparison operation on the sampled previous data signal and the sampled current data signal, encoding the binary value 0 into a first current level according to a result value of the comparison operation, encoding the binary value 1 into a second current level lower than the first current level, and encoding a current binary value identical to a previous binary value into a third current level lower than the first current level and higher than the second current level; receiving one of the encoded first to third current levels; detecting the received current level and generating first and second logic voltages according to the detected current level; and performing an operation on the first and second logic voltages to restore the data signal and the request signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
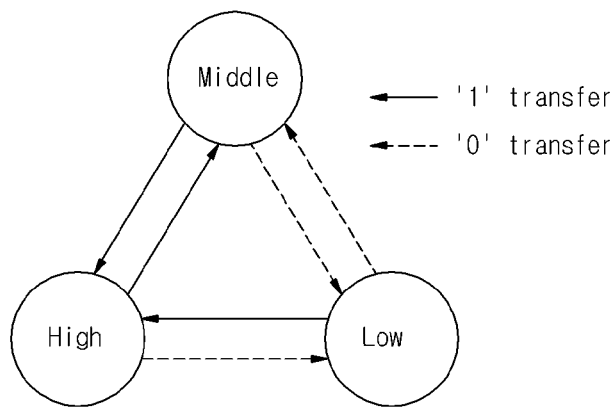
FIG. 1 is a view illustrating a logic state change of a value encoded according to a 2-phase ternary encoding method applied to a data transmitting device according to an exemplary embodiment.

FIG. 1 is a view illustrating a logic state change of a value encoded according to a 2-phase ternary encoding method applied to a data transmitting device according to an exemplary embodiment.

Referring to FIG. 1, according to a 2-phase ternary encoding method applied to the data transmitting device, a data signal is formatted with a Non-Return-to-Zero (NRZ) method having no space state in order to display a binary value 0 and a binary value 1. The data signal formatted with the NRZ method is encoded with three logic states. For example, if a binary value 1 is transmitted, a data signal is encoded with a high state, and if a binary value 0 is transmitted, a data signal is encoded with a low state.

If a binary value of a current data signal identical to that of a previous data signal, the current data signal is encoded with a middle state. Of course, although a data signal representing a binary value 0 may be encoded with a high state and a data signal representing a binary value 1 may be encoded with a low state, it is assumed herein that a data signal representing a binary value 0 is encoded with a low state and a data signal representing a binary value 1 is encoded with a high state.

In the exemplary embodiment, encoded values representing the three logic states (i.e., High, Middle, and Low) are converted into different three current levels to be transmitted to a receiver. For example, the high state is represented as a first current level, and the low state is represented as a second current level that is lower than the first current level. The middle state is represented as a third current level that is lower than the first current level and higher than the second current level. Here, if a data signal representing a binary value 0 is encoded with a high state and a data signal representing a binary value 1 is encoded with a low state, the data signal representing a binary value 0 can be converted into the first current level and the data signal representing the binary value 1 can be converted into the third current level.

Unlike a related art 4-phase ternary encoding method, the 2-phase ternary encoding method applied to the data transmitting device does not have a space state, thereby transmitting a data signal through less signal conversions.

Figure 2:
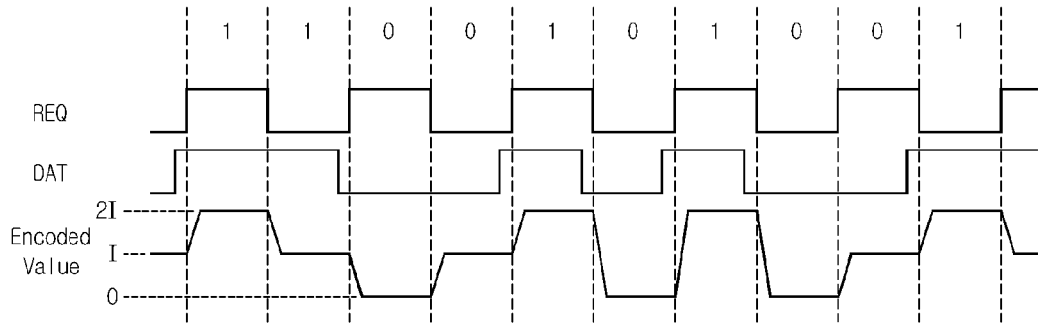
FIG. 2 is a timing diagram illustrating a value encoded according to a 2-phase ternary encoding method applied to a data transmitting device according to an exemplary embodiment.

FIG. 2 is a timing diagram illustrating a value encoded according to a 2-phase ternary encoding method applied to a data transmitting device according to an exemplary embodiment.

Referring to FIG. 2, a value encoded according to the 2-phase ternary encoding method applied to the data transmitting device is transmitted to a receiver through a 2-phase bundled data transmitting method.

In the 2-phase bundled data transmitting method used for the data transmitting device, as illustrated in FIG. 2, a data signal DAT and a request signal REQ are required. The request signal REQ is used to extract binary values 1 and 0 of the data signal DAT. That is, the data signal DAT is extracted into the binary value 1 and the binary value 0 with reference to the transition point of the request signal REQ. Consequently, the bundle data transmitting method requires the request signal REQ for sampling the data signal DAT.

In order for the data signal DAT to be stably transmitted to the receiver, the data signal DAT should be sampled stably by the request signal REQ. Therefore, according to the bundled data transmitting method, as illustrated in FIG. 2, the data signal DAT is first stabled and the request signal REQ is then generated (asserted). That is, a rising point of the data signal DAT is set faster than a rising point of the request signal REQ.

Referring to FIG. 2, one example of an encoded value in a 2-phase bundled data transmitting environment is illustrated through a series of data signals 1 1 0 0 1 0 1 0 0 1 and the request signal REQ.

As illustrated in FIG. 1, if an encoded value is in a high state, the data signal DAT representing a binary value 1 is transmitted to the receiver as a first current level 2I. If the encoded value is in a low state, the data signal DAT representing a binary value 0 is transmitted to the receiver as a second current level 0 lower than the first current level 2I. Additionally, if the encoded value is in a middle state, the data signal DATA representing the same binary value as the previous binary value is transmitted to the receiver as a third current level I lower than the first current level 2I and higher than the second current level I.

In the same manner, according to the exemplary embodiment, the three states (i.e., High, Middle, and Low) are converted into different current levels and then are transmitted to the receiver, in order to realize a ternary encoding method. Accordingly, the exemplary embodiment employs a multiple valued logic circuit using a current mode method in which the three states are converted into the different current levels.

The multiple valued logic circuit includes a voltage mode method and a current mode method. The current mode method is employed in this exemplary embodiment.

If the multiple valued logic circuit of the voltage mode method is employed in this exemplary embodiment, in order to represent the three states, a first voltage level 2 V, a second voltage level (i.e., 0 V or GND) lower than the first voltage level 2 V, and a third voltage level V lower than the first voltage level and higher than the second voltage level will be used.

However, it is undesirable that the multiple valued logic circuit of the voltage mode method is used to represent the three states.

As mentioned in the background, due to the development of semiconductor fabrication technologies, the tendency is toward lowering a supply voltage in an integrated circuit. Under this circumstance, the multiple valued logic circuit of the voltage mode method deteriorates a noise margin of a voltage in a circuit of a receiver. That is, while the supply voltage is lowered, a noise margin between three state levels becomes less.

Since the multiple valued logic circuit of the current mode method can control an amount of current regardless of a supply voltage, a noise margin can be achieved more than before. Furthermore, since current has the small swing width compared to voltage, power consumption can be reduced. Therefore, the multiple valued logic circuit of the current mode method is used in this exemplary embodiment to represent the three level states.

Hereinafter, a data transmitting device using a DI data transmitting method will be made based on the contents described with reference to FIGS. 1 and 2.

Figure 3:
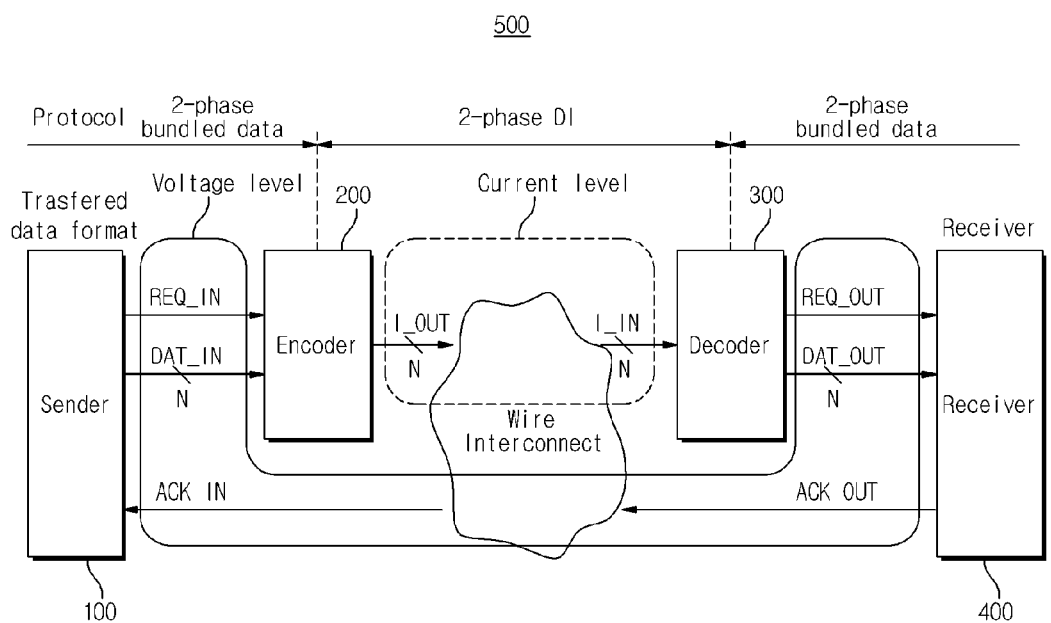
FIG. 3 is a block diagram illustrating an entire structure of a data transmitting system according to an exemplary embodiment.

FIG. 3 is a block diagram illustrating an entire structure of a data transmitting system according to an embodiment.

Referring to FIG. 3, the data transmitting system 500 according to an exemplary embodiment includes a sender 100, an encoder 200, a decoder 300, and a receiver 400.

The sender 100 generates an input request signal REQ_IN of a voltage level and an input data signal DAT_IN having an NRZ format of a voltage level. The generated input request signal REQ_IN and input data signal DAT_IN having the NRZ format are transmitted to the encoder 200 through a 2-phase bundled data transmitting method supporting a 2-phase handshake protocol.

In response to the input data signal DAT_IN and the input request signal REQ_IN applied from the sender 100, the encoder 200 encodes a binary value of the input data signal DAT_IN into an output current signal I_OUT having three current levels.

In more detail, the encoder 200 outputs an output current signal I_OUT of a first current level if the input data signal DAT_IN representing a binary value 1 is applied from the sender 100. If the input data signal DAT_IN representing a binary value 0 is applied, the encoder 200 outputs an output current signal I_OUT of a second current level lower than the first current level. If the input data signal DAT_IN representing a current binary value identical to a previous binary value is applied, the encoder 200 outputs an output current signal I_OUT of a third current level lower than the first current level and higher than the second current level. According to a 2-phase DI data transmitting method, the output current signal I_OUT outputted from the encoder 200 is transmitted into the decoder 300 connected to the encoder 200 through a wire.

The decoder 300 receives the output current signal I_OUT having a current level outputted from the encoder 200, as an input signal I_IN having a current level through a wire, and then recovers the input request signal REQ_IN and the input data signal DAT_IN having a voltage level from the input signal I_IN of a current level. The decoder 300 transmits the recovered input request signal REQ_IN to the data receiver 400 as an output data signal DAT_OUT through the 2-phase bundled data transmitting method.

The data receiver 400 generates an output reply signal ACK_OUT of a voltage level in response to the data signal DAT_OUT and the output request signal REQ_OUT transmitted from the decoder 300, and then the sender 100 receives the generated output reply signal ACK_OUT as an input reply signal ACK_IN. Once the data sender 100 receives the input reply signal ACK_IN, one cycle is completed.

In brief, the encoder 200 converts an input request signal and an input data signal of a 2-phase binary voltage mode into a current level. Three logic states (i.e., High, middle, and low) of a ternary form are allocated to the converted current level. Unlike the related art, according to the exemplary embodiment, no space state is allocated to the converted current level. Instead of that, a middle state representing a logic state of a current binary value identical to that of a previous binary value is allocated to the current level. This means that the data transmitting device of a 2-phase DI data transmitting method according to the exemplary embodiment has more excellent performance in an aspect of data transmission efficiency for delivering only effective data, compared to a data transmitting device of a related art 4-phase DI data transmitting device. The decoder 300 recovers the current level generated in the encoder 200 into the original input request signal and input data signal.

The sender 100 and the receiver 400 are locally synchronous modules of a GALS system, and a 2-phase bundled data protocol is used for them during data communication between the sender 100 and the receiver 400. The encoder 200 and the decoder 300 does not have a storage unit of a buffer form for storing transmitted signals between the sender 100 and the receiver 400. Accordingly, the input reply signal ACK_IN outputted from the receiver 400 is transmitted into the sender 100 through a binary voltage form.

Figure 4:
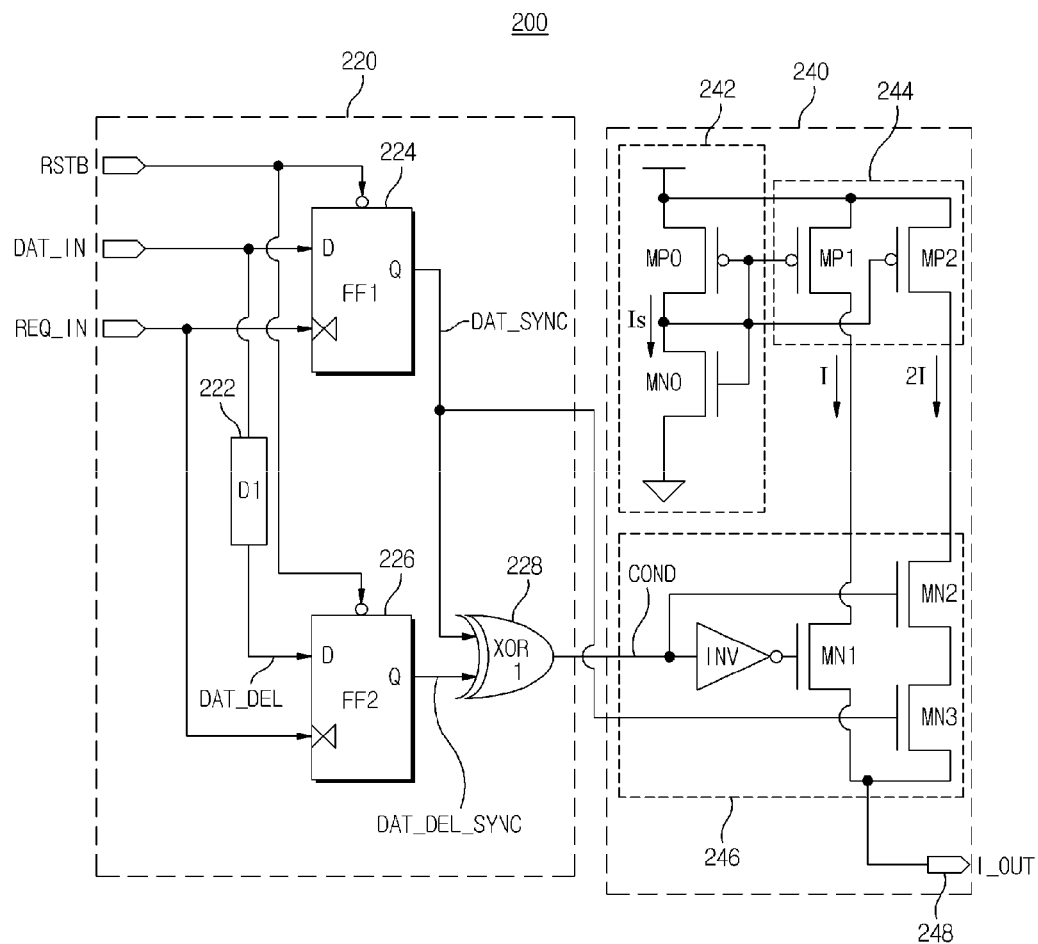
FIG. 4 is a circuit diagram illustrating an internal structure of an encoder of FIG. 3.

FIG. 4 is a circuit diagram illustrating an internal structure of the encoder of FIG. 3.

Referring to FIG. 4, the encoder 200 includes a data comparator 220 and a voltage to current converter 240. The data comparator 220 generates a logic signal of a voltage form representing three logic states in response to the input request signal REQ_IN and the input data signal DAT_IN received from the sender 100. The voltage to current converter 240 generates first to third current levels 2I, 0, and I according to the logic signal from the data comparator 220.

In more detail, the data comparator 220 includes a delayer 222, a first flip-flop 224, a second flip-flop 226, and an XOR gate 228.

The delayer 222 generates a delay data signal DAT_DEL that delays the data signal DAT_IN received from the data receiver 100 by a predetermined delay time t1.

The first flip-flop 224 samples the input data signal DAT_IN at each transition point of the input request signal REQ_IN. For this, the first flip-flop 224 operates based on a dual edge triggering method. That is, the first flip-flop 224 samples the input data signal DAT_IN at a rising edge (or, a leading edge) and a falling edge (or, trailing edge) of the input request signal REQ_IN. The input data signal DAT_IN is applied to an input terminal of the first flip-flop 224, and the input request signal REQ_IN is applied to a clock terminal. An inverted reset signal RSTB for resetting the first flip-flop 224 is applied to a reset terminal. An output terminal of the first flip-flop 224 outputs a data signal DAT_SYNC that is sampled at the rising edge and the falling edge of the output request signal REQ_IN. Here, the second input terminal of the first flip-flop 224 is indicated with a symbol ▷◁ in order to represent the dual edge triggering method.

The second flip-flop 226 operates based on the same dual edge triggering method as the first flip-flop 224, and samples the delay data signal DAT_DEL delayed by the delayer 222 at each transition point of the input request signal REQ_IN. The delay data signal DAT_DEL delayed by the delayer 222 is applied to an input terminal of the second flip-flop 226, and the input request signal REQ_IN is applied to a clock terminal of the second flip-flop 226. An output terminal of the second flip-flop 226 outputs a delay data signal DAT_DEL_SYNC that is sampled at each rising edge and falling edge of the input request signal REQ_IN.

The XOR gate 228 performs an XOR (i.e., exclusive-OR) operation on the data signal DAT_SYNC sampled by the first flip-flop 224 and the delay data signal DAT_DEL_SYNC sampled by the second flip-flop 226, and then outputs the result value as an operation signal COND. Under the assumption that an $n^{th}$ inputted input data signal DAT_IN applied to the data comparator 22 is a currently-inputted input data signal DAT_IN_n (hereinafter, referred as a current input data signal) and an $n-1^{th}$ inputted input data signal DAT_IN is a previously-inputted input data signal DAT_IN_n-1 (hereinafter, referred as a previous input data signal), the XOR gate 228 performs an XOR operation on the sampled current data single DAT_IN_n and the sampled previous data signal DAT_IN_n-1. Accordingly, if the logic states of the previous and current input data signals are the same, the XOR gate 228 outputs an operation signal COND of logic 0. On the other hand, if the logic states of the previous and current input data signals are different, the XOR gate 228 outputs an operation signal COND of logic 1.

The voltage to current converter 240 outputs first to third current levels 2I, 0, and I according to logic combination of a logic state of the sampled data signal DAT_SYNC and a logic state of the operation signal COND from the data comparator 220.

In more detail, the voltage to current converter 240 includes a current source for encoding 242, a current mirror circuit for encoding 224, and an output circuit 246.

The current source for encoding 242 includes a PMOS transistor MP0 and an NMOS transistor MN0. The PMOS transistor MP0 and the NMOS transistor MN0 are connected in series through a common node connecting a drain of the PMOS transistor MP0 and a drain of the NMOS transistor MN0 between a power source and a ground. According to the current source for encoding 242, a voltage between the drain and the source of the PMOS transistor MP0 and a voltage between the gate and the source of the NMOS transistor MN0 are the same. Additionally, a voltage between the gate and the source of the NMOS transistor MN0 and a voltage between the gate and the source of the NMOS transistor MN0 are the same. Therefore, the PMOS transistor MP0 and the NMOS transistor MN0 operate in a saturation region always, such that a constant current Is of a predetermined level flows through the common node.

The current mirror circuit 244 generates a first current level 2I and a third current level I according to a current level of the constant current Is. In more detail, the current mirror circuit 244 includes first and second PMOS transistors MP1 and MP2. The constant current Is generated from the current source for encoding 242 is copied into a drain of the first PMOS transistor MP1 and a drain of the second PMOS transistor MP2, respectively. At this point, the size of the second PMOS transistor MP2 is two times that of the first PMOS transistor MP1. Therefore, an amount of current corresponding to the third current level I is copied into the drain of the first PMOS transistor MP1 and an amount of current corresponding to the first current level 2I (that is twice the third current level I) is copied into the drain of the second PMOS transistor MP2. Here, the size means a ratio (W/L) of the channel width W and the channel length L of the transistor.

The output circuit 246 selectively outputs one of the first to third current levels 2I, O, and I according to a combination of a logic state of the sampled data signal DAT_SYNC applied from the data comparator 220 and a logic state of the operation signal COND. In more detail, the output circuit 246 includes an inverter INV, and first to third NMOS transistors NM1, NM2, and NM3. The inverter INV inverts the operation signal COND outputted from the XOR gate 228 of the data comparator 220. The first NMOS transistor NM1 has a drain receiving a third current level I from the current mirror circuit for encoding 244, a gate receiving the operation signal COND inverted by the inverter INV, and a source connected to the output terminal 248 outputting the third current level I as the output current signal I_OUT. The second NMOS transistor NM2 has a drain receiving a first current level 2I of the current mirror circuit for encoding 224, a gate receiving the operation signal COND outputted from the XOR gate 228 of the data comparator 220, and a source connected to a drain of the third NMOS transistor. The third NMOS transistor NM3 has a drain connected to the source of the second NMOS transistor NM2, a gate receiving the sampled data signal DAT_SYNC outputted from the first flip-flop 224, and a source connected to the output terminal 248 outputting the first current level 2I (which is applied to the drain of the second NMOS transistor NM2) as an output current signal I_OUT.

According to the output circuit 246, if the operation signal COND applied from the data comparator 220 is logic 1 and the sampled data signal DAT_SYNC is logic 0, since the first and third NMOS transistors MN1 and MN3 are turned off, a current level flowing through the output terminal 248 of the output circuit 246 is 0.

If the operation signal COND is logic 1 and the sampled data signal DAT_SYNC is logic 1, the first NMOS transistor MN1 is turned off and the second and third NMOS transistors MN2 and MN3 are turned on. Therefore, a current level flowing through the output terminal 248 of the output circuit 246 is 2I.

If the operation signal COND is logic 0, regardless of a logic state of the sampled data signal DAT_SYNC, a current level flowing through the output terminal 248 of the output circuit 246 is I.

As a result, if a logic state of a current input data signal DAT_IN_n applied from the sender 100 to the encoder 200 is identical to a logic state of a previous input data signal DAT_IN_n−1 (that is, a logic state of the operation signal COND is 0), the encoder 200 outputs a third current level I corresponding to a middle state.

Additionally, if a logic state of a current input data signal DAT_IN_n applied from the data sender 100 to the encoder 200 is different from a logic state of a previous input data signal DAT_IN_n−1 (that is, a logic state of the operation signal COND is 1), the encoder 200 outputs a first current level corresponding to a high state or a second current level 0 corresponding to a low state according to a logic state of the sampled data signal DAT_SYNC. That is, if a logic state of the sampled data signal DAT_SYNC is 1, the encoder 200 outputs a first current level 2I, and if a logic state of the sampled data signal DAT_SYNC is 0, the encoder 200 outputs a second current level 0.

Table 1 below illustrates a current level outputted from the encoder 200 according to a combination of the operation signal COND and the sampled data signal DAT_SYNC, based on the contents described until now.

TABLE 1

| DAT_SYNC | COND 0 | COND 1 |
|---|---|---|
| 0 | I | 0 |
| 1 | I | 2I |

Figure 5:
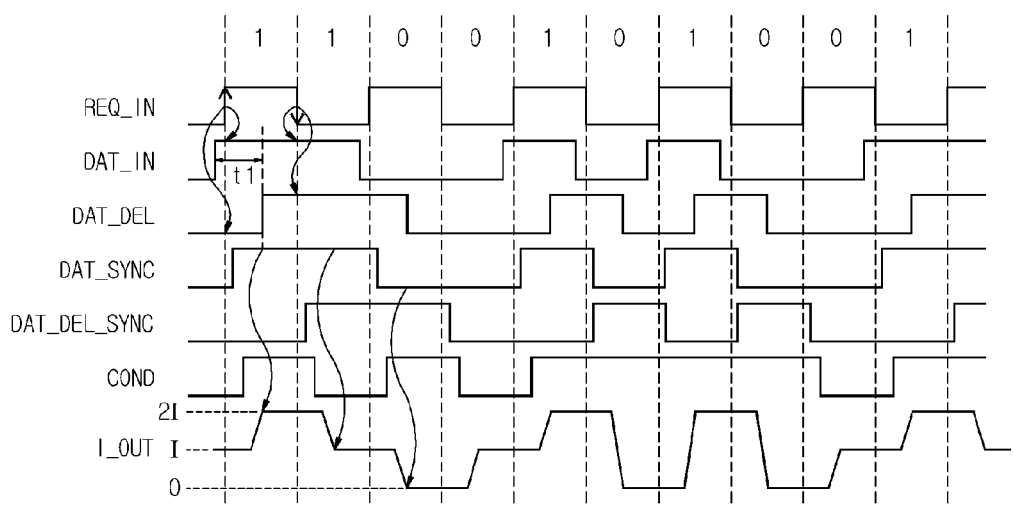
FIG. 5 is a timing diagram illustrating signals generated in an encoder of FIG. 4.

FIG. 5 is a timing diagram illustrating signals generated in the encoder of FIG. 4.

Referring to FIGS. 4 and 5, at a rising edge and a falling edge of the input request signal REQ_IN, a current data signal DAT_IN_n and the next input data signal DAT_IN_n+1 are respectively latched and then sequentially outputted from the first flip-flop 224 of the data comparator 220. In the second flip-flop 226, the previous input data DAT_IN_n−1 is latched and outputted at a rising edge of the input request signal REQ_IN. Also, at the falling edge of the input request signal REQ_IN, the current input data signal DAT_IN_n delayed by the predetermined delay time t1 in the delayer 222 is latched and outputted.

In the bundled data transmitting method, one of two input signals REQ_IN and DAT_IN applied to the data comparator 220 is generated first. Accordingly, in the flip-flop 224, a current input data signal DAT_IN_n is stably sampled at a rising edge of the input request signal REQ_IN. That is, the first flip-flop 224 latches a current data signal DAT_IN_n at a rising edge of the input request signal REQ_IN and outputs the latched current data signal DAT_IN_n as the sampled data signal DAT_SYNC_n.

Since the current input data signal DAT_IN_n delayed by the predetermined delay time t1 in the delayer 222 is applied to the second flip-flop 226, the previous input data signal DAT_IN_n−1 is sampled at a rising edge of the input request signal REQ_IN. That is, the second flip-flop 224 latches the previous input data signal DAT_IN_n−1 at a rising edge of the input request signal REQ_IN, and then outputs the latched previous input data signal DAT_IN_n−1 as the sampled previous data signal DAT_DEL_SYNC_n−1.

Finally, an XOR operation is performed on the current data signal DAT_SYNC_n sampled from the first flip-flop 224 and a previous data signal DAT_DEL_SYNC_n−1 sampled from the second flip-flop, and then the result value is generated as the operation signal COND (assert).

As illustrated in FIG. 5, if the sampled current data signal DAT_SYNC_n and the operation signal COND are respectively logic 1 and logic 1, the encoder outputs a first current level 2I. If the operation signal is logic 0 regardless of an output value of the first flip-flop 224, the encoder 200 outputs a third current level I. If an output value from the first flip-flop 224 is logic 0 and the operation signal COND is logic 1, the encoder 200 outputs a second current level 0.

Figure 6:
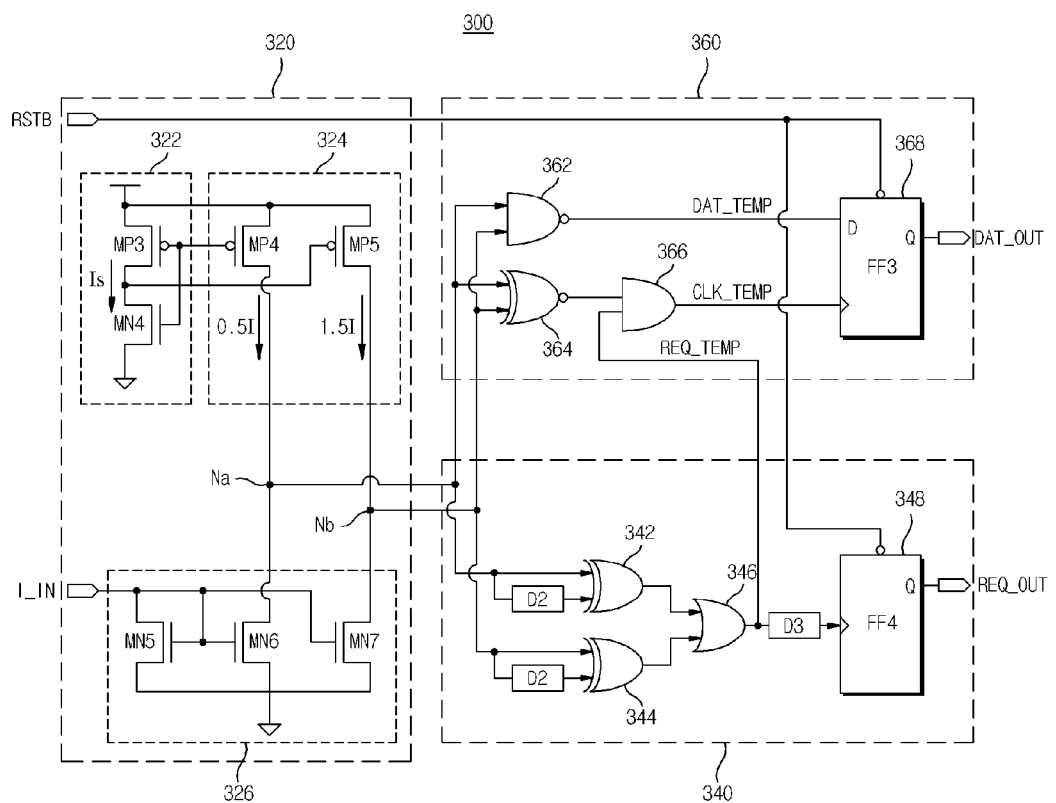
FIG. 6 is a circuit diagram illustrating an inner structure of a decoder of FIG. 3.
Figure 7:
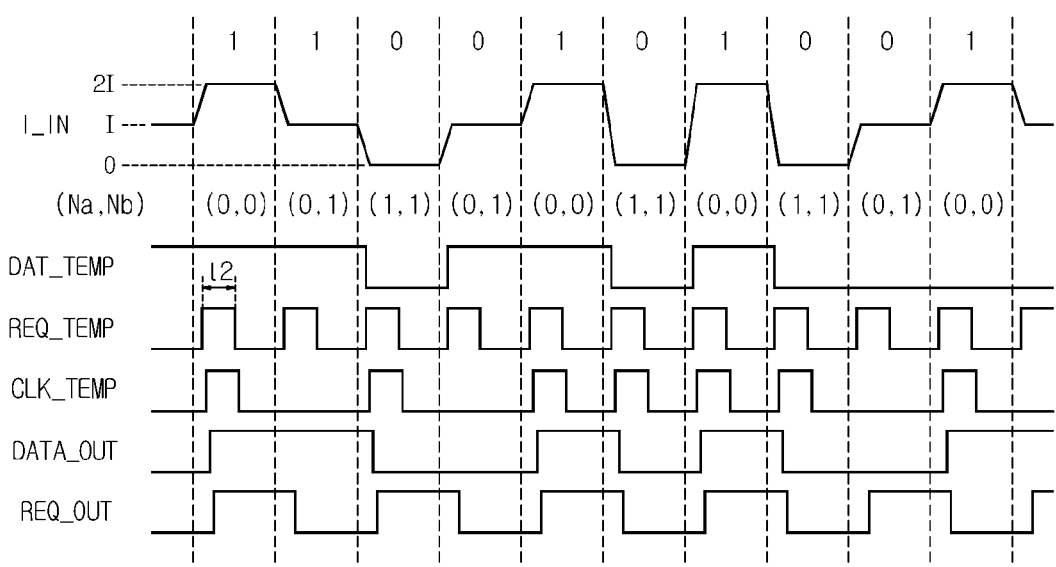
FIG. 7 is a timing diagram illustrating inner signals generated in a decoder of FIG. 6.

FIG. 6 is a circuit diagram illustrating an inner structure of the decoder of FIG. 3. FIG. 7 is a timing diagram illustrating inner signals generated in the decoder of FIG. 6.

Referring to FIG. 6, the decoder 300 includes a current to voltage converter 320, a request signal restorer 340, and a data signal restorer 360.

The current to voltage converter 320 receives an output current signal I_OUT from the encoder 200, transmitted through a 2-phase DI transmitting method, as an input current signal I_IN, and then converts a current level of the input current signal I_IN into a voltage mode signal.

The request signal restorer 340 restores a request signal REQ_IN according to a voltage mode signal from the current to voltage converter 320, and generates the restored input request signal REQ_IN as an output request signal REQ_OUT.

The data signal restorer 360 restores an input data signal DAT_IN according to a signal generated in the request signal restorer 340 and the voltage mode signal, and generates the restored input data signal DAT_IN as an output data signal DAT_OUT.

The decoder 300 will be described in more detail.

First, the current to voltage converter 320 includes a current source for decoding 322, a current mirror circuit for decoding 324, an input current mirror circuit 326, and first and second output nodes Na and Nb.

The current source for decoding 322 generates a constant current Is. In response to a current level of a constant current Is from the current source for decoding 322, the current mirror circuit for decoding 324 generates a first reference current 0.5I and a second reference current 1.5I of a predetermined current level that is necessary for detecting a current level of an input current signal I_IN transmitted from the encoder 200. The input current mirror circuit 326 differentiates the first and second reference currents 0.5I and 1.5I generated in the current mirror circuit for decoding 324, in response to a current level of the input current single I_IN applied from the encoder 200. The output nodes Na and Nb detects the differentiated first and second reference currents 0.5I and 1.5I, and recovers the detected differential current into a voltage node signal.

The current to voltage converter 320 will be described below in more detail.

First, the current source for decoding 322 includes a third PMOS transistor MP3 and a fourth NMOS transistor MN4 connected in series between a voltage source and a ground. Here, the current source for decoding 322 has the same structure and functions as the current source for encoding 242 of FIG. 4. Therefore, its detailed description will be omitted for conciseness.

The current mirror circuit for decoding 324 includes a fourth PMOS transistor MP4 and a fifth PMOS transistor MP5. Likewise, the current mirror circuit for decoding 324 has the same structure and functions as the current mirror circuit for encoding 244 of FIG. 4, and thus its detailed description will be omitted for conciseness. However, the current mirror circuit for decoding 324 is identical to the current mirror circuit for encoding 244 except that the first reference current 0.5I is copied into the drain of the fourth PMOS transistor MP4 and the second reference current 1.5I is copied into the drain of the fifth PMOS transistor MP4 in the current mirror circuit for decoding 324.

The input current mirror circuit 326 includes fifth, sixth, and seventh NMOS transistors MN5, MN6, and MN7. An input current signal I_IN transmitted from the encoder 200 is applied to a drain and a gate of the fifth NMOS transistor NM5, and a source of the fifth NMOS transistor NM5 is connected to a ground. A first reference current 0.5I from the current mirror circuit for decoding 324 is applied to the drain of the sixth NMOS transistor MN6 through the first output node Na. The input current signal I_IN is applied to the gate of the sixth NMOS transistor MN6. The source of the NMOS transistor MN6 is applied to the ground. A second reference current 1.5I from the current mirror circuit for decoding 324 is applied to the drain of the seventh NMOS transistor MN7 through the second output node Nb. The input current signal I_IN is applied to the gate of the seventh NMOS transistor MN7. The source of the seventh NMOS transistor MN7 is applied to the ground.

As mentioned above, since the drain of the fourth PMOS transistor MP4 and the drain of the fifth PMOS transistor MP5 are respectively connected to the drain of the sixth NMOS transistor MN6 and the drain of the seventh NMOS transistor MN7 through the first and second output nodes Na and Nb, the input current mirror circuit 326 constitutes a kind of a current comparator circuit. That is, the input current mirror 326 detects a current level of the input current signal I_IN through a differential current between the input current signal I_IN encoded with the first to third current levels and the reference currents 0.5I and 1.5I generated in the current mirror circuit for decoding 324. Therefore, potential states of the first and second output nodes Na and Nb are changed according to the difference between the input current signal I_IN and the reference currents 0.5I and 1.5I. Additionally, an original voltage level can be restored according to a changed potential state of the first and second output nodes Na and Nb.

If the input current signal I_IN has a second current level 0, since the drains of the sixth and seventh NMOS transistors MN6 and MN7 of the input current mirror circuit 326 do not pull a current, the first and second output nodes Na and Nb represent a potential state of logic 1.

If the input current signal I_IN has a third current level I, since the drain of the sixth NMOS transistor MN6 uses the first reference current 0.5I in order to pull the third current level I, the first output node Na represents a potential state of logic 1 but the second output node Nb represents a potential state of logic 1 because a differential current exists.

If the input current signal I_IN has a first current level 2I, the first and second output nodes Na and Nb represent a potential state of logic 0.

The request signal restorer 340 and the data signal restorer 360 restore an input request signal REQ_OUT and an output data signal DAT_OUT as the output request signal REQ_OUT and the output data signal DAT_OUT, respectively, through potential states of the first and second output nodes Na an Nb that are changed according to a current level of the input current signal I_IN.

The request signal restorer 340 detects a change of a potential state of the first and second output nodes Na and Nb to generate an output request signal REQ_OUT that is restored from a periodic temp request signal REQ_TEMP and an output request signal REQ_OUT. For this, the request signal restorer 340 includes a third XOR gate 342, a fourth XOR gate 344, an OR gate 346, and a fourth flip-flop 348. The third XOR gate 342 receives a logic state of the first output node Na and a logical state of the first output delayed by a predetermined time in the delayer D2. The fourth XOR gate 344 receives a logic state of the second output node Nb and a logic state of the second output node Nb delayed by a predetermined time in the delayer D2. The OR gate 346 performs an OR operation on an output value of the third XOR gate 342 and an output value of the fourth XOR gate 344 to output a temp request signal REQ_TEMP. The fourth flip-flop 348 outputs an output request signal REQ_OUT in response to the temp request signal REQ_TEMP delayed by the predetermined time in the delayer D 3. Here, the fourth flip-flop 348 may be a T flip-flop.

The data signal restorer 360 generates a temp data signal DAT_TEMP and a temp clock signal CLK_TEMP through a logic state (or, a potential state) of the first and second output nodes Na and Nb and the temp request signal REQ_TEMP of the OR gate 346 in the request signal restorer 340.

The data signal restorer 360 samples the temp data signal DAT_TEMP through the temp clock signal CLK_TEMP, and then outputs the sampled temp data signal DAT_TEMP as an output data signal. For this, the data signal restorer 360 includes a NAND gate 362, an XNOR gate 364, an AND gate 366, and a third flip-flop 368. The NAND gate 362 receives a logic state of the first output node Na and a logic state of the second output node Nb. The XNOR gate 364 receives a logic state of the first output node Na and a logic state of the second output node Nb. The AND gate 366 receives an output value of the XNOR gate 364 and the temp request signal REQ_TEMP from the request signal restorer 340 to output a temp clock signal CLK_TEMP. The third flip-flop 368 samples the temp data signal DAT_TEMP through the temp clock signal CLK_TEMP to output an output data signal DAT_OUT.

FIG. 7 is a timing diagram of inner signals generated in the decoder of FIG. 6.

As illustrated in FIG. 7, the request signal restorer 340 of FIG. 6 detects logic states (or, potential states) of the first and second output nodes Na and Nb to generate a periodic temp request signal REQ_TEMP having a high interval during a predetermined delay time set by the delayer D2.

Through the temp request signal REQ_TEMP, the data signal restorer 360 generates a temp clock signal CLK_TEMP at a point when an input current signal I_IN of a first current level 2I or a third current level 0 is inputted.

The third flip-flop 368 in the data signal restorer 360 samples the temp data signal DAT_TEMP through the generated temp clock signal CLK_TEMP. The sampled temp data signal DAT_TEMP is finally provided as an output data signal DAT_OUT that is restored from the input data signal DAT_IN.

Additionally, the temp request signal REQ_TEMP generated in the request signal restorer 340 allows the fourth flip-flop 348 to output an output request signal REQ_OUT in which the input request signal REQ_IN is restored. At this point, since the temp request signal REQ_TEMP is inputted to the fourth flip-flop 348, it is delayed by the predetermined time in the delayer D3. Therefore, the assumption that bundled data are required between the output data signal DAT_OUT and the output request signal REQ_OUT is satisfied.

According to the exemplary embodiments, since data are transmitted through a DI data transmitting method supporting a 2-phase handshake protocol, they can be stably transmitted regardless of the length of a wire.

Additionally, according to the exemplary embodiments, since data are encoded using a ternary encoding method having no space state, in an aspect of a data transmission rate, more improved performance can be achieved compared to a related art 4-phase delay data transmitting method.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A data transmitting device transmitting data according to a delay insensitive data transmitting method, the data transmitting device comprising:
    a data transmitter configured to generate a request signal and a data signal, the data signal having a Non-Return-to-Zero (NRZ) format that is divided into a binary value 0 and a binary value 1 at a transition point of the request signal; and
    an encoder configured to receive the request signal and the data signal and output an output current signal based on the received request signal and data signal,
    wherein the encoder comprises:
        a data comparator configured to generate a delay data signal by delaying the data signal by a predetermined delay time, sample the data signal and the delay data signal using the request signal, and output the sampled data signal and an operation signal that is obtained by comparing the sampled data signal and the sampled delay data signal; and
        a voltage to current converter configured to output the output current signal having different current levels according to a logical combination of the sampled data signal and the operation signal.

2. The data transmitting device of claim 1, wherein:
    the output current signal comprises one of a first current level, a second current level, and a third current level at a transition point of the request signal, the second current level being lower than the first current level, the third current level being lower than the first current level and higher than the second current level;
    if the encoder transmits the data signal having the binary value 1, the output current signal having the first current level is outputted;
    if the encoder transmits the data signal having the binary value 0, the output signal having the second current level is outputted; and
    if the encoder transmits the data signal having a current binary value identical to a previous binary value, the output current signal having the third current level is outputted.

3. The data transmitting device of claim 2, wherein the voltage to current converter comprises:
   a current source configured to generate a constant current;
   a current mirror circuit configured to generate a first current of the first current level and a third current of the third current level using the constant current; and
   an output circuit configured to output the output current signal having the first to third current levels selectively according to a combination of a logic state of the sampled data signal and a logic state of the operation signal.

4. The data transmitting device of claim 3, wherein the output circuit comprises:
   an inverter configured to invert the operation signal;
   a first NMOS transistor having a gate receiving the inverted operation signal output from the inverter, a drain receiving the third current, a source coupled to an output terminal through which the output current signal is outputted;
   a second NMOS transistor having a gate receiving the operation signal and a drain receiving the first current; and
   a third NMOS transistor having a gate receiving the sampled data signal, a drain coupled to a source of the second NMOS transistor, and a source coupled to the output terminal.

5. The data transmitting device of claim 1, wherein the data comparator comprises:
   a delayer configured to delay the data signal by the predetermined delay time;
   a first flip-flop configured to sample the data signal at a transition point of the request signal and output the sampled data signal;
   a second flip-flop configured to sample the delay data signal at a transition point of the request signal and output the sampled delay data signal; and
   a logic gate configured to perform an exclusive-OR (XOR) operation on the sampled data signal and the sampled delay data signal and output the operation signal.

6. The data transmitting device of claim 5, wherein the first and second flip-flops operate at a rising edge and a falling edge of the request signal through a dual edge triggering method to sample the data signal and the delay data signal, respectively.

7. A data receiving device receiving a request signal and a data signal from a transmitter through a delay insensitive data transmitting method, the data receiving device comprising:
   a decoder configured to receive an input current signal having three logic states, generate a voltage value corresponding to the three logic states using a reference current, and restore the request signal and the data signal using the generated voltage value; and
   a data receiver configured to transmit a reply signal to the transmitter in response to the restored request signal and the restored data signal,
   wherein the decoder comprises:
      a current to voltage converter configured to differentiate a current level of the reference current and a current level of the received input current signal, and output first and second logic voltages corresponding to the differentiated current level;
      a request signal restorer configured to generate a periodic temp request signal using the first and second logic voltages, delay the temp request signal, and restore the request signal in which a logic level is changed at each rising point of the delayed temp request signal; and
      a data signal restorer configured to perform a first operation on the first and second logic voltages to generate a temp data signal, perform a second operation on the first and second logic voltages and the temp request signal to generate a temp clock signal, and sample the temp data signal using the temp clock signal to restore the data signal.

8. The data receiving device of claim 7, wherein the restored data signal is a Non-Return-to-Zero (NRZ) format that is divided into a binary value 0 and a binary value 1 at a transition point of the restored request signal.

9. The data receiving device of claim 7, wherein the input current signal has one of a first current level corresponding to a high state that represents a binary 1, a second current level corresponding to a low state that represents a binary 0, and a third current level corresponding to a middle state that represents a current binary value identical to a previous binary value, the second current level being lower than the first current level, the third current level being lower than the first current level and higher than the second current level.

10. The data receiving device of claim 7, wherein the input current signal has one of a first current level corresponding to a low state that represents a binary 0, a second current level corresponding to a high state that represents a binary 1, and a third current level corresponding to a middle state that represents a current binary value identical to a previous binary value, the second current level being lower than the first current level, the third current level being lower than the first current level and higher than the second current level.

11. The data receiving device of claim 7, wherein the request signal restorer comprises:
   a first logic gate configured to perform an XOR operation on the first logic voltage and a delayed first logic voltage that is obtained by delaying the first logic voltage by a predetermined time;
   a second logic gate configured to perform an XOR operation on the second logic voltage and a delayed second logic voltage that is obtained by delaying the second logic voltage by the predetermined time;
   a third logic gate configured to perform an OR operation on an output of the first logic gate and an output of the second logic gate to output the temp request signal;
   a delayer configured to delay the temp request signal; and
   a flip-flop configured to generate the request signal in which a logic level is changed at each rising point of the delayed temp request signal.

12. The data receiving device of claim 11, wherein the data signal restorer comprises:
   a fourth logic gate configured to perform a NAND operation on the first and second logic voltages to generate the temp data signal;
   a fifth logic gate configured to perform an XNOR operation on the first and second logic voltages;
   a sixth logic gate the configured to perform an AND operation on an output value of the fifth logic gate and the temp request signal to generate the temp clock signal; and
   a flip-flop configured to sample the temp data signal according to the temp clock signal.

13. The data receiving device of claim 7, wherein the first operation comprises a NAND operation, and the second operation comprises an XNOR operation that is performed on the first and second logic voltages and an AND operation that is performed on a result value of the XNOR operation and the temp request signal.

14. A data transmitting system including a plurality of locally synchronous modules that perform mutual data communications through a delay insensitive data transmitting method, the data transmitting system comprising:
- a data transmitter configured to generate a request signal and a data signal, the data signal having a Non-Return-to-Zero (NRZ) format that is divided into a binary value 0 and a binary value 1 at a transition point of the request signal;
- an encoder configured to receive the request signal and the data signal and output an output current signal having three different current levels based on the request signal and the data signal;
- a decoder configured to detect a current level of the output current signal, generate a voltage value corresponding to the detected current level, and restore the request signal and the data signal according to the generated voltage value; and
- a data receiver configured to generate a reply signal in response to the restored request signal and the restored data signal to transmit the reply signal to the data transmitter, wherein the encoder comprises:
- a data comparator configured to generate a delay data signal by delaying the data signal by a predetermined delay time, sample the data signal and the delay data signal using the request signal, and output the sampled data signal and an operation signal that is obtained by comparing the sampled data signal and the sampled delay data signal; and
- a voltage to current converter configured to output the output current signal having different current levels according to a logical combination of the sampled data signal and the operation signal.

15. The data transmitting system of claim 14, wherein data communication between the data transmitter and the encoder and data communication between the decoder and the data receiver are accomplished through a 2-phase bundled data transmitting method.

16. The data transmitting system of claim 14, wherein the reply signal is in a voltage form.

17. The data transmitting system of claim 14, wherein the decoder comprises:
- a current to voltage converter configured to differentiate a current level of a reference current and a current level of the output current signal, and output first and second logic voltages corresponding to the differentiated current level;
- a request signal restorer configured to generate a periodic temp request signal using the first and second logic voltages, delay the temp request signal, and restore the request signal in which a logic level is changed at each rising point of the delayed temp request signal; and
- a data signal restorer configured to generate a temp data signal based on the first and second logic voltages, generate a temp clock signal based on the first and second logic voltages and the temp request signal, and sample the temp data signal using the temp clock signal to restore the data signal.

18. A data transmitting method transmitting data through a delay insensitive data transmitting method, the method comprising:
- receiving a request signal and a data signal, the data signal having a Non-Return-to-Zero (NRZ) format that is divided into a binary value 0 and a binary value 1 at a transition point of the request signal;
- delaying the data signal by a predetermined delay time to output a delay data signal;
- sampling the data signal and the delay data signal using the request signal;
- comparing the sampled data signal and the sampled delay data signal, outputting an operation signal based on the comparison result, and outputting an output current signal having one of three different current levels according to a logical combination of the sampled data signal and the operation signal;
- receiving the output current signal having one of the three different current levels;
- detecting the received current level and generating first and second logic voltages according to the detected current level; and
- restoring the data signal and the request signal based on the first and second logic voltages.

19. The data transmitting method of claim 18, wherein the one of the first to third current levels is received through a 2-phase delay insensitive data transmitting method.

20. The data transmitting method of claim 18, wherein the restoring of the data signal and the request signal comprises:
- generating a periodic temp request signal using the first and second logic voltages;
- delaying the temp request signal;
- restoring the request signal in which a logic level is changed at each rising point of the delayed temp request signal;
- generating a temp data signal based on the first and second logic voltages;
- generating a temp clock signal based on the first and second logic voltages and the temp request signal; and
- sampling the temp data signal using the temp clock signal to restore the data signal.

* * * * *